(12) United States Patent
Hatanaka et al.

(10) Patent No.: US 7,197,229 B2
(45) Date of Patent: *Mar. 27, 2007

(54) DIGITAL SIGNAL RECORDING DEVICES, DIGITAL SIGNAL RECORDING/PLAYBACK DEVICES, AND DIGITAL SIGNAL RECEIVING/RECORDING/PLAYBACK DEVICES

(75) Inventors: Yuji Hatanaka, Yokohama (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 11/110,691

(22) Filed: Apr. 21, 2005

(65) Prior Publication Data
US 2005/0185934 A1 Aug. 25, 2005

Related U.S. Application Data

(63) Continuation of application No. 10/154,958, filed on May 28, 2002, now Pat. No. 6,920,279, which is a continuation of application No. 09/090,919, filed on Jun. 5, 1998, now Pat. No. 6,397,000.

(30) Foreign Application Priority Data
Sep. 9, 1997 (JP) ................................ 9-243667

(51) Int. Cl.
*H04N 5/91* (2006.01)

(52) U.S. Cl. ........................ 386/66; 386/98; 386/112; 386/124

(58) Field of Classification Search ................. 386/83, 386/124, 112, 109, 98, 111, 66, 65
See application file for complete search history.

(56) References Cited

U.S. PATENT DOCUMENTS 5,555,097 A 9/1996 Joung et al.
5,566,174 A 10/1996 Sato et al.

(Continued)

FOREIGN PATENT DOCUMENTS

JP 07-226026 8/1995

(Continued)

*Primary Examiner*—Vincent F. Boccio
(74) *Attorney, Agent, or Firm*—Antonelli, Terry, Stout and Kraus, LLP.

(57) ABSTRACT

A digital signal recording device or a digital signal recording and playback device which receives an inputted digital signal having a predetermined packet format and including a digital video signal and a digital audio signal. The device also receives an inputted analog video signal and an inputted analog audio signal, converts the analog video signal and the analog audio signal to a digital video signal and a digital audio signal, compresses the digital video signal and the digital audio signal and multiplexes the compressed digital video signal and the compressed digital audio signal to produce a multiplexed digital signal having the selected one of the inputted digital signal and the multiplexed digital signal as a digital recording signal, and records the digital recording signal to produce a recorded digital signal.

6 Claims, 9 Drawing Sheets

U.S. PATENT DOCUMENTS

| | | |
|---|---|---|
| 5,649,048 A | 7/1997 | Tomita et al. |
| 5,699,392 A | 12/1997 | Dokic |
| 5,754,651 A * | 5/1998 | Blatter et al. .................. 386/83 |
| 5,790,202 A | 8/1998 | Kummer et al. |
| 5,832,085 A | 11/1998 | Inoue et al. |
| 5,907,371 A | 5/1999 | McNay et al. |
| 5,926,228 A | 7/1999 | Jeon et al. |
| 5,995,705 A | 11/1999 | Lang |
| 6,005,562 A * | 12/1999 | Shiga et al. ................ 725/138 |
| 6,052,506 A | 4/2000 | Fukushima et al. |
| 6,397,000 B1 * | 5/2002 | Hatanaka et al. ............ 386/124 |
| 6,920,279 B2 * | 7/2005 | Hatanaka et al. ............. 386/98 |
| 2002/0064378 A1 * | 5/2002 | Seto ............................ 386/112 |

FOREIGN PATENT DOCUMENTS

| | | |
|---|---|---|
| JP | 08-098164 A | 4/1996 |
| JP | 08-125973 | 5/1996 |
| JP | 09-009196 | 1/1997 |
| JP | 09-186968 | 7/1997 |

\* cited by examiner

FIG.1

FIG.3A MAIN DATA

FIG.3B SUBCODE

DIGITAL SIGNAL RECORDING DEVICES, DIGITAL SIGNAL RECORDING/PLAYBACK DEVICES, AND DIGITAL SIGNAL RECEIVING/RECORDING/PLAYBACK DEVICES

CROSS-REFERENCE TO RELATED APPLICATIONS

This is a continuation of application Ser. No. 10/154,958 filed 28 May 2002 now U.S. Pat. No. 6,920,279, allowed, which is a continuation of application Ser. No. 09/090,919 filed 5 Jun. 1998 and issued as U.S. Pat. No. 6,397,000 B1, the contents of all of which is incorporated herein in its entirety.

BACKGROUND OF THE INVENTION

The present invention relates to digital signal recording devices, digital signal recording/playback devices, and digital signal receiving/recording/playback devices, for receiving/recording/playing back a digital signal.

JP-A-8-98164 discloses a receiving system and a recording/playing back device for receiving/recording a transmitted multiplexed digital signal as a conventional technique for recording/playing back a digital signal. This prior art publication describes a receiving system which includes receiving means for receiving a transmitted multiplexed digital information signal and for selecting desired information, and recording means for recording the information received by the receiving means.

This prior art system is capable of recording/playing back an incoming digital signal as it is, but it cannot convert an analog television signal like terrestrial broadcasting waves used at present to a digital signal, and record/play back the digital signal.

SUMMARY OF THE INVENTION

It is therefore an object of the present invention to provide a digital signal receiving device, a digital signal recording/playing back device and a digital signal receiving/recording/playing back device, having the functions of converting an analog television signal to a digital signal, and recording/playing back the digital signal in a digital signal receiving/recording/playing back system.

According to one aspect of the present invention, there is provided a digital signal recording device comprising:

a digital input means for inputting to the recording device a digital signal indicative of video, audio, data and so forth multiplexed in a predetermined packet form;

an analog video signal input means for inputting an analog video signal to the recording device;

an analog audio signal input-means for inputting an analog audio signal to the recording device;

a video A/D converter for converting the analog video signal inputted by the analog video signal input means to a digital signal;

a video encoder for information-compressing the digital video signal to which the analog video signal is converted by the video A/D converter;

an audio A/D converter for converting the analog audio signal inputted by the analog audio input means to an digital signal;

an audio encoder for information-compressing the digital audio signal to which the analog audio signal is converted by the audio A/D converter;

a multiplexing means for multiplexing at least the video signal compressed by the video encoder and the audio signal compressed by the audio encoder into a multiplexed signal of a predetermined packet form; and a record selecting means for selecting one of the digital signal inputted by the digital input means and the multiplexed digital signal provided by the multiplexing means; and a recording means for recording the digital signal selected by the record selecting means

DESCRIPTION OF THE PREFERRED EMBODIMENTS

Embodiments of the present invention will be described next with reference to the accompanying drawings.

Figure 1:
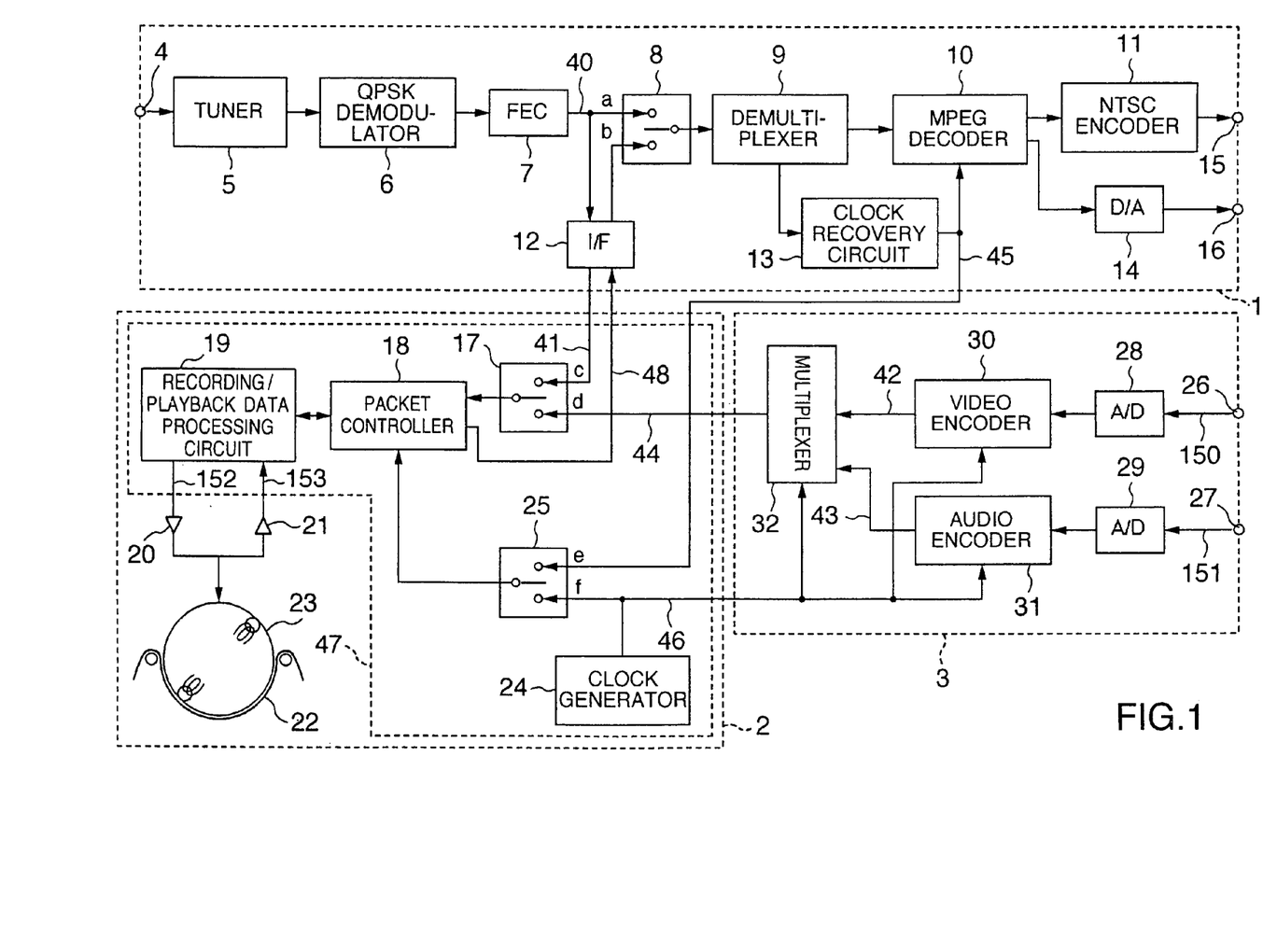
FIG. 1 is a block diagram of a first embodiment of the present invention.

FIG. 1 is a block diagram of a receiving/recording/playing back device for a digital broadcasting signal in a first embodiment of the present invention. In FIG. 1, reference numeral 1 denotes a digital broadcasting receiving device (Integrated Receiver & Decoder: IRD), 2 a recording/playback device, 3 an encoder, 4 a digital broadcasting signal input terminal, 5 a tuner, 6 a QPSK demodulator, 7 a forward error correction (FEC) unit for correcting an error involved in the transmission of a signal, 8 a playback changeover switch, 9 a demultiplexer, 10 a MPEG decoder, 11 an NTSC encoder, 12 an interface between the devices 1 and 2, 13 a clock recovery unit, 14 a D/A converter, 15 a video output terminal, 16 an audio output terminal, 17 a recorded signal changeover switch, 18 a packet control circuit, 19 a recording/playback data processing, 20 a record amplifier, 21 a playback amplifier, 22 a magnetic tape, 23 a rotary head, 24 a clock generator, 25 a clock changeover switch, 26 a video input terminal, 27 an audio input terminal, 28 a video A/D converter, 29 an audio A/D converter, 30 a video encoder, 31 an audio encoder, 32 a multiplexer, and 47 a digital signal processor.

Figure 2:
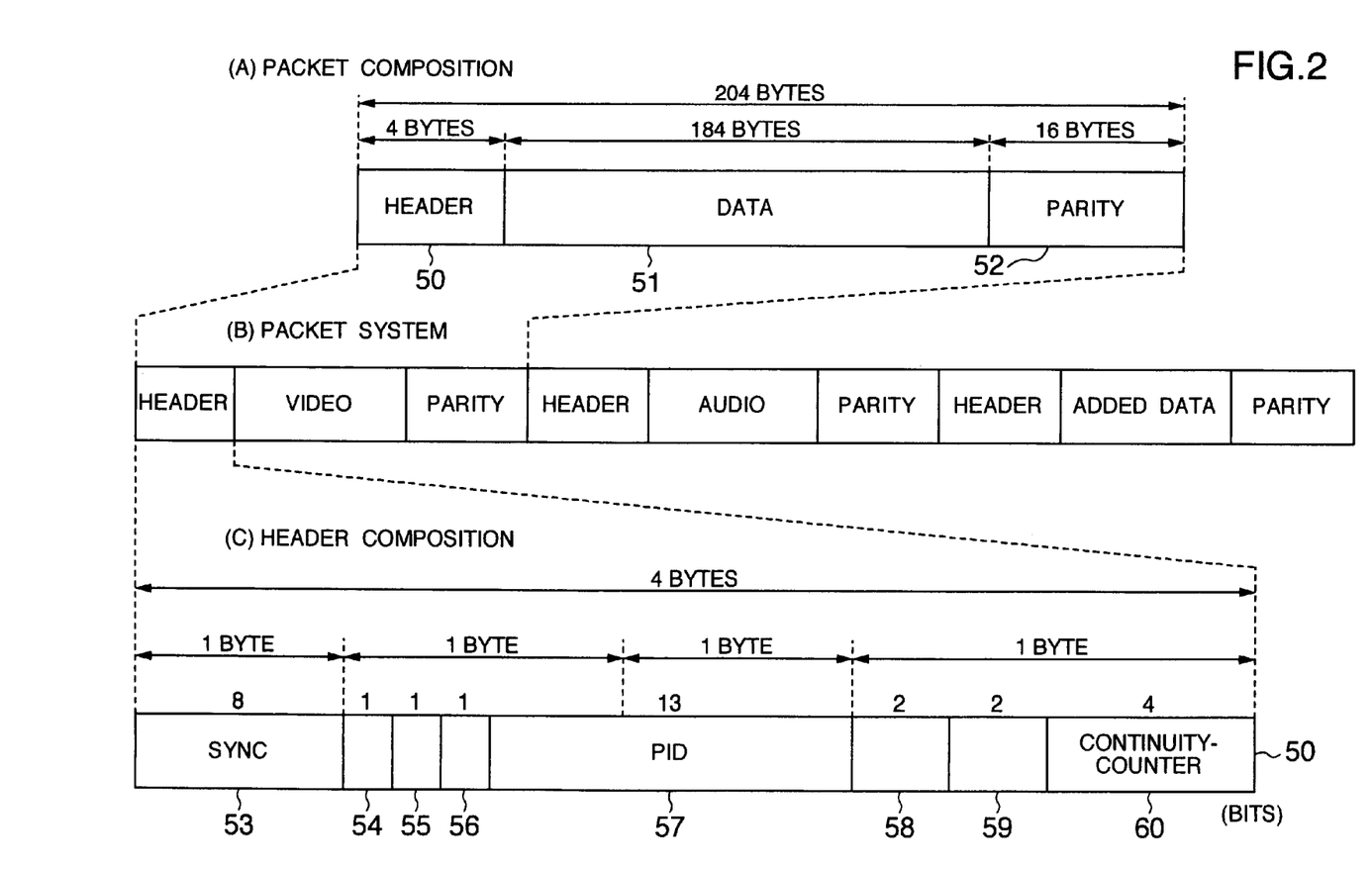
FIG. 2 illustrates a packet composition and a packet multiplexing system.

FIG. 2 shows a composition of a transmitted digital broadcasting signal. As shown in a packet composition of FIG. 2(A), the transmission signal has a packet composition of 204 bytes; a 4-byte header 50; a 184-byte data 51 representing information on a video, audio, added data, etc., compressed in a compression system called, for example, MPEG 2 (Moving Picture Expert Group 2) as an international standard, and a 16-byte parity 52. The packets of those video, audio, added data, etc., are received in a multiplexing manner on a time divisional basis on a transmission line, as shown in FIG. 2(B). Generally, not only one program, but also a plurality of programs of video, audio and added data is multiplexed on a time divisional basis. The header composition of FIG. 2(C) shows a content of the header 50. In FIG. 2(C), reference numeral 53 denotes a sync byte indicative of the head of the packet, 54 a transport error indicator, 55 a payload unit start indicator, 56 a transport priority, 57 a PID indicative of attributes of the packet, 58 a transport scrambling control, 59 an adaptation field control, and 60 continuity counter, each showing attributes and status of the packet, composed of 4 bytes in all. The numerals appearing on top of the packet each represent the number of bits of a respective subpacket.

A digital broadcasting signal sent from a satellite is received at the digital broadcasting signal input terminal 4, and inputted to the tuner 5 which selects and outputs a desired signal. The output from the tuner 5 is demodulated by the QPSK demodulator 6 and then inputted to the FEC 7, which corrects an error involved in the received digital signal in the transmission. The output from the FEC 7 is delivered to the playback changeover switch 8 and the interface 12.

When the broadcasting signal is outputted from the present device, the playback changeover switch 8 is set at a contact a to input the output from the FEC 7 to demultiplexer 9, which determines a type of a respective packet, using the PID 57, etc., of the header 50, separates only packets of a video, audio, etc., relating to a specified program, and then outputs these packets to the MPEG decoder 10. The multiplexed signal contains a packet called, for example, a PCR (Program Clock Reference) indicative of time information representing the time when compression took place in a broadcasting station concerned. Thus, the clock recovery unit 13 reproduces a data clock 45 using this PCR. The decoder clock 45 reproduced by the clock recovery unit 13 is controlled so as to have the same frequency as a clock used in a compressor (not shown) which compresses video and audio data information in accordance with the MPEG 2 in the broadcasting station. The MPEG decoder 10 expands the respective video and audio signals compressed in accordance with the MPEG 2, etc., by using the received separating signal and the data clock 45 reproduced by the clock reproducing unit 13, and provides decoded video/audio signals. The video signal is converted by the NTSC encoder 11 to a television analog video signal, which is then output from the video output terminal 15. The audio signal is converted by the D/A converter 14 to an analog audio signal, which is then outputted from the audio output terminal 16.

When the received signal is recorded in the recording/playback device 2, the output from the FEC 7 is inputted to the interface 12, which separates packets of video and audio information and added information relating to a program to be recorded as in the demultiplexer 9. When the received signal is recorded and played back by the recording/playback device 2, it is required to record even program information required for automatic selection of a broadcasting station. Thus, in addition to the packet selected by the demultiplexer 9, the interface 12 also selects information on another program and also converts a part of the packet. The signal separated by the interface 12 is inputted to the packet control circuit 18 by selecting a contact c by the recording signal changeover switch 17. As shown in main data of FIG. 3A, the packet control circuit 18 divides 188-byte packet data into 92- and 96-byte packet data A and B, and adds a 4-byte packet header 98 to the packet data A. The packet control circuit 18 also produces in the packet header 98 a time stamp, shown in a hatched area 102, which is data on a time when the packet is received.

Figures 3A, 3B:
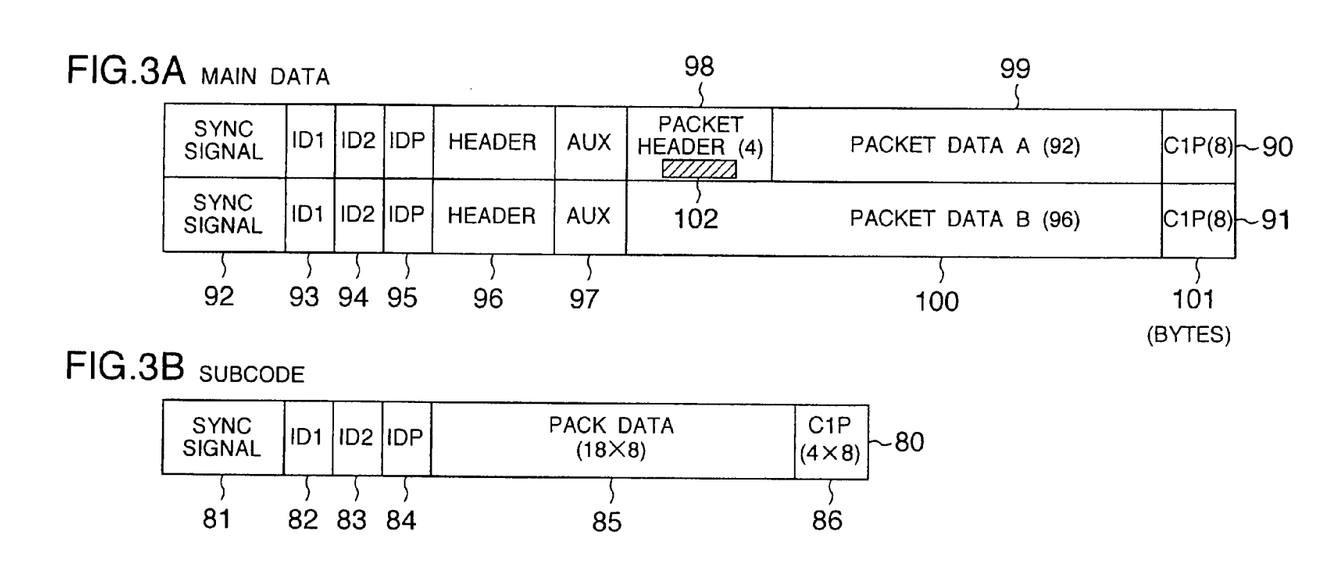
FIGS. 3A and 3B each show a block format in the recording device.
Figure 4:
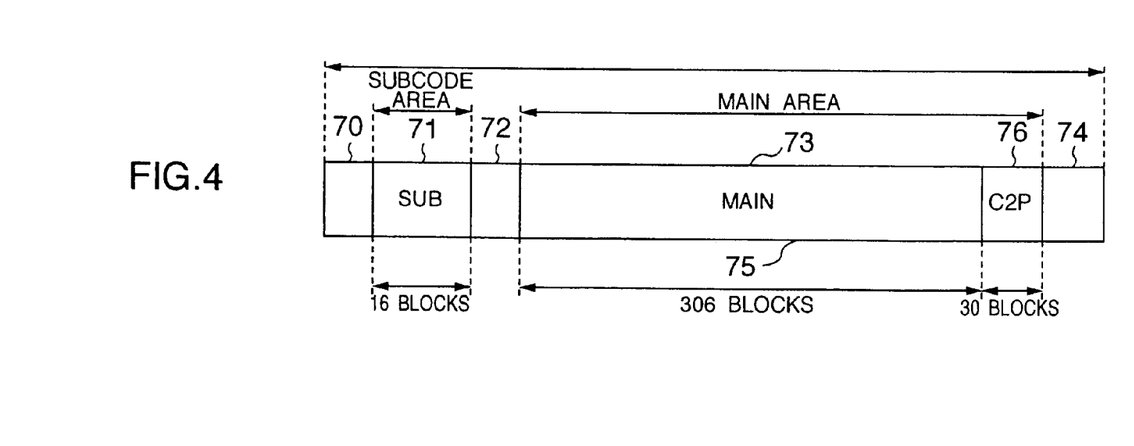
FIG. 4 shows a track format in the recording device.
Figure 5A:
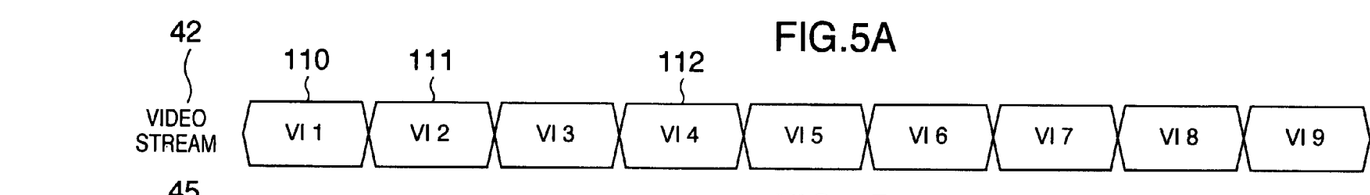
FIGS. 5A–5E each are a timing chart indicative of a packet multiplexed output in a multiplexer.
Figure 5B:
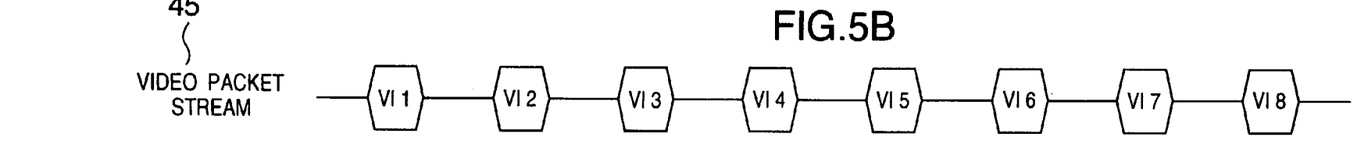
Figures 5C, 5D:
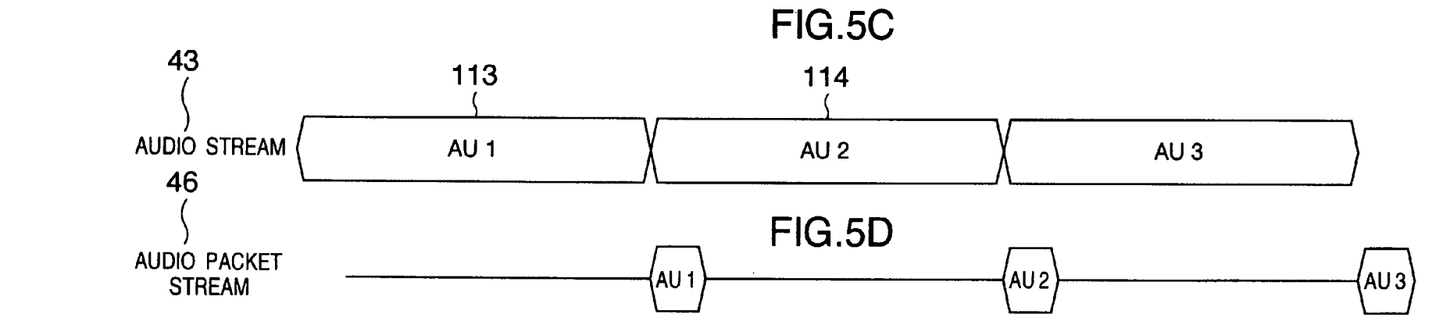
Figure 5E:
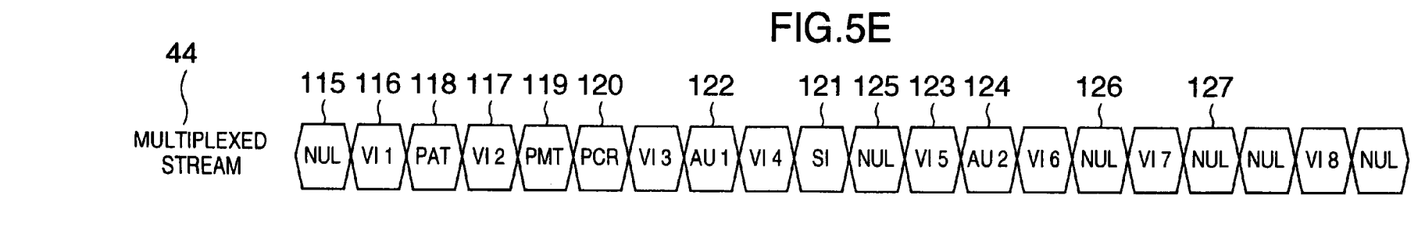

As shown in FIG. 3A, additional information AUX 97 and a header 96 are further added by the recording/playback circuit 19 to each of the packet data A and B, in which the packet data A already has the added header 98, to thereby provide data blocks 90 and 91. The recording/playback circuit 19 further adds an error correction signal C1P101, a sync signal 92 indicative of the head of the block, signals ID1 (93) and ID2 (94) representing information on the positions of the blocks, and a signal IDP 95 which represents an error check parity for the ID1 (93) and ID2 (94) are added to each of the blocks 90 and 91, and the resulting signals are recorded via the record amplifier 20 by the rotary head 23 onto the magnetic tape 22. FIG. 4 shows a recording format on the magnetic tape 22 formed when the rotary head 23 rotates through 180 degrees. Areas 70–76 are for a preamble, a subcode of additional information, a gap, main data having the block structure of FIG. 3A, a postamble, main data, and a parity C2P for error correction in main data 75, respectively. The subcode 71 has a pack composition called pack data, as shown in FIG. 3B.

In reproduction, a signal 153 reproduced by the rotary head 23 is inputted via the playback amplifier 21 to the recording/playback circuit 19, which detects the sync signal 92, signals ID1 (93), ID2 (94), etc., and corrects errors, using the C1P101, C2P76, etc., extracts packet data A 99 and B 100 and then sends those data to the packet control circuit 18. The packet control circuit 18 outputs the respective packets at the same intervals of time as in the recording, in accordance with the time stamp 102 added when the data is recorded, and then sent via the interface 12 to the playback changeover switch 8. When a reproduced picture is to be obtained, the playback changeover switch 8 is set at the contact b to thereby send a reproduced packet to the demultiplexer 9. The demultiplexer 9 automatically selects a broadcasting station on the basis of a packet on program information separated and converted by the interface 12 when the data is recorded, and outputs only a packet required for the MPEG decoder 10. Video/audio signals are obtained in a manner similar to that in which an output is obtained from a broadcasting signal.

Also, in playback, the data clock 45 used in the MPEG decoder 10 is required to obtain the same frequency as it was compressed in the broadcasting station. To this end, at least the respective PCR time intervals inputted when recorded are required to be maintained, reproduced and outputted correctly. To this end, in recording, the time stamp 102 is added in the packet control circuit 18. In playback, the respective packets are outputted by the packet control circuit 18 in accordance with the time stamps 102 to maintain the time intervals at which the packets are outputted. To this end, clocks used for producing the time stamp 102 in the recording should be decoder clock 45 reproduced by the clock recovery unit 13. In recording, the clock changeover switch 25 is set at a contact e so that the decoder clock 45 is inputted to the packet control circuit 18.

In reproduction, the clock recovery unit 13 of the digital broadcasting receiver 1 is operated by a timing signal outputted from the packet control circuit 18 to produce decoder clock 45. Thus, the packet control circuit 18 cannot use the decoder clock 45. In order to avoid this, the clock generator 24 which generates a fixed clock 46 is provided so that when the clock changeover switch 25 is set at a contact f, the fixed clock 46 is inputted to the packet control circuit 18 and a packet is outputted at a timing generated by the fixed clock 46. Thus, the clock recovery unit 13 is able to generate a stabilized clock depending on the fixed clock 46. The clock generator 24 generally uses a crystal oscillator. In this case, the frequency of the crystal oscillator should be within the standards of MPEG 2, etc.

Recording/playback of an analog broadcasting such as a terrestrial broadcasting performed at present in the present recording/playback device will be described next.

When the analog broadcasting signal is recorded, an analog video signal 150 is inputted to the video input terminal 26 of the encoder 3 of FIG. 1. The video A/D converter 28 converts the analog video signal to a digital video signal. The video encoder 30 compresses the image, using the MPEG 2, etc., as in the compression of the digital broadcasting signal, and outputs the compressed signal to the multiplexer 32. An analog audio signal 151 is inputted to the audio input terminal 27, and converted by the audio A/D converter 29 to a digital audio signal. The audio encoder 31 compresses the digital audio signal, and also outputs this signal to the multiplexer 32, which multiplexes a video stream 42 produced by the video encoder 30 and an audio stream 43 produced by the audio encoder 31.

FIGS. 5A–5E show an example of timing in the multiplexing operation. In FIGS. 5A–5E, VIs 1 (100) and 2 (111), etc., in the video stream 42 represent the respective video packets compressed by the video encoder 30. AUs 1 (113), 2 (114), etc., in the audio stream 43 represent the respective audio packets compressed by the audio encoder 31. Reference numeral 44 denotes a multiplexed stream obtained from the multiplexer 32 in which the length of each packet depends on a transfer rate which in turn depends on the compression rate. Generally, the transmission rate of the audio stream 43 is lower than that of the audio stream 42.

As shown in FIGS. 5A–5E, the multiplexer 32 temporarily stores the video and audio streams 42 and 43, and outputs them as the video and audio packet streams 45 and 46 at the same transfer rate. The multiplexer 32 further outputs both the packets 45 and 46 in a time divisional manner onto a signal at a fixed transfer rate, which is generally higher than the sum of the transmission rates of the video and audio streams 42 and 43. It further produces a packet PAT 118, PMT 119, PCR 120, SI table 121, etc., on program information stipulated under the MPEG2 standards, and outputs then those data during a time when no video/audio are transmitted. A reference symbol PMT represents the PID of packets of video/audio which compose one program. A reference symbol PAT describes the PID of a packet of a PMT corresponding to each program. A reference symbol SI represents information on a copy guard, a code indicative of each of discrete points in the recording, etc. The PAT and PMT used when a signal obtained by analog-to-digital conversion and compression of an analog broadcasting signal is recorded and reproduced may be stipulated uniquely as in the present invention or allocated to any one of the existing programs under the digital broadcasting.

Reference symbols NULs 115, 125 and 126 denote senseless dummy data whose quantities are each dependent on the difference between the total number of packets and the transmission rate of the multiplexed stream.

As shown in FIGS. 5A–5E, the video stream 42, auido stream 43, other packets, and NULs are multiplexed on a time-divisional basis to form a single signal. The respective video packets VIs 1 (110), 2 (111), etc. on the video stream 42 are the same in content as the VIs 1 (116), 2 (112) etc., on the multiplexed stream 44. Similarly, the respective audio packets AUs 1 (113), 2 (114) etc., of the audio stream 43 are the same in content as the AUs 1 (122), 2 (124) etc., of the multiplexed stream 44.

Thus, the multiplexed stream 44 has a stream composition similar to the output of the interface 12 of the digital broadcasting receiver 1. Thus, the recording signal changeover switch 17 selects a contact d and inputs the multiplexed stream 44 to the packet control circuit 18 to thereby record/playback the multiplexed stream 44 in the same manner as the digital broadcasting signal.

When the multiplexed stream 44 is recorded, the clock frequency used for producing the time stamp 102 in the packet control circuit 18 is required to have the same frequency as the clock used in the video and audio encoders 30 and 31, as described with respect to the recording of the digital broadcasting. Thus, as shown in FIG. 1, the video encoder 30, audio encoder 31, and multiplexer 32 are operated at the fixed clock 46 generated by the clock generator 24, the clock changeover switch 25 is set at a contact f so that the fixed clock 46 is inputted to the packet control circuit 18. Also, in playback, the clock changeover switch 25 is set at the contact f while the packet control circuit 18 uses the fixed clock 46.

Figure 6:
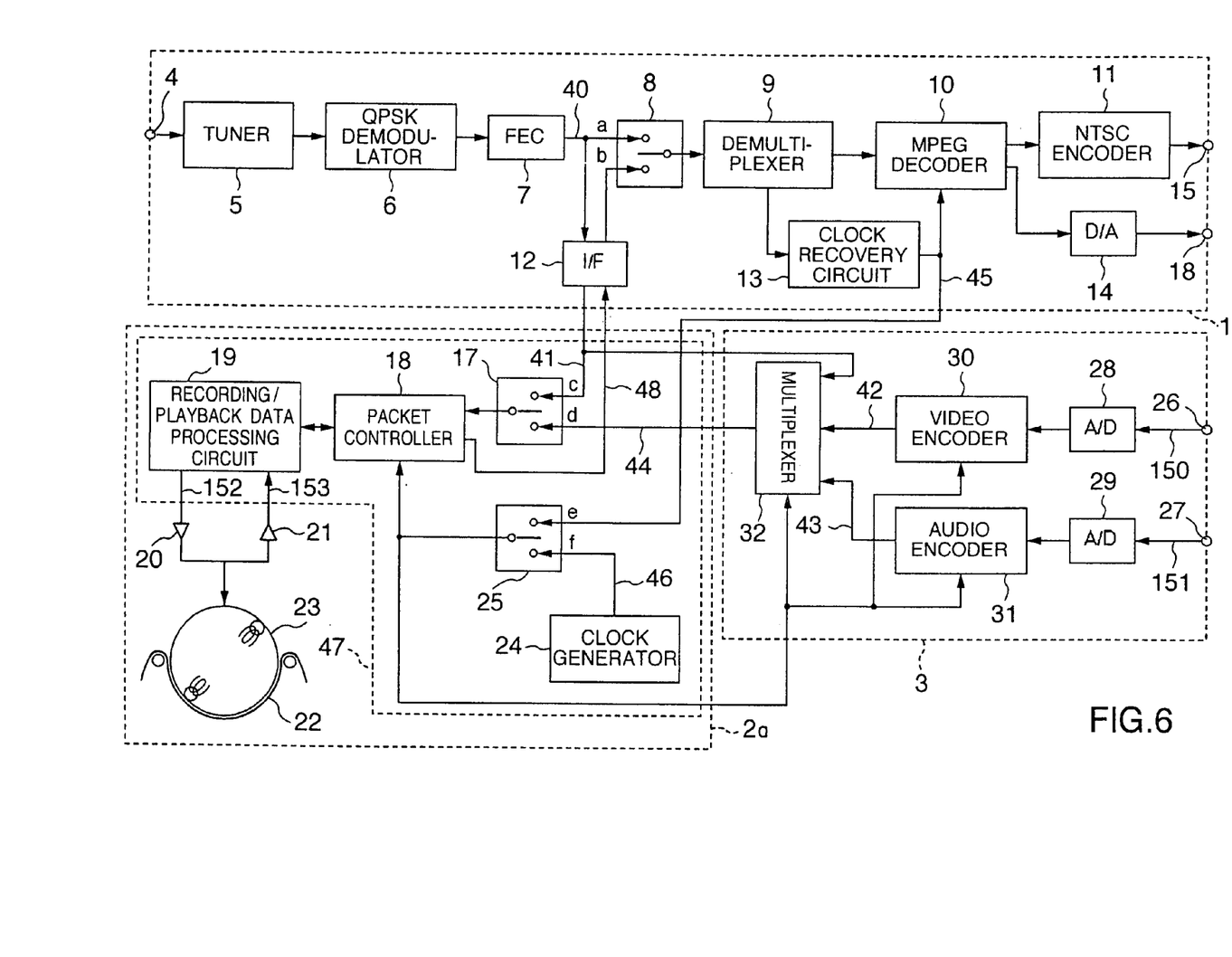
FIG. 6 is a block diagram of a second embodiment of the present invention.

When there is a margin in the transfer rate given to the recording/playback device, the digital and analog broadcasting signals are recordable simultaneously. FIG. 6 is a block diagram of a device for receiving, recording and playing back a digital broadcasting signal in this case. This device is different in operation from the FIG. 1 device in that the broadcasting stream which is the output from the interface 12 is also inputted to the multiplexer 32, and that the video encoder 30, audio encoder 31 and multiplexer 32 are operated with the clock outputted from the clock changeover switch 25.

Figure 7A:
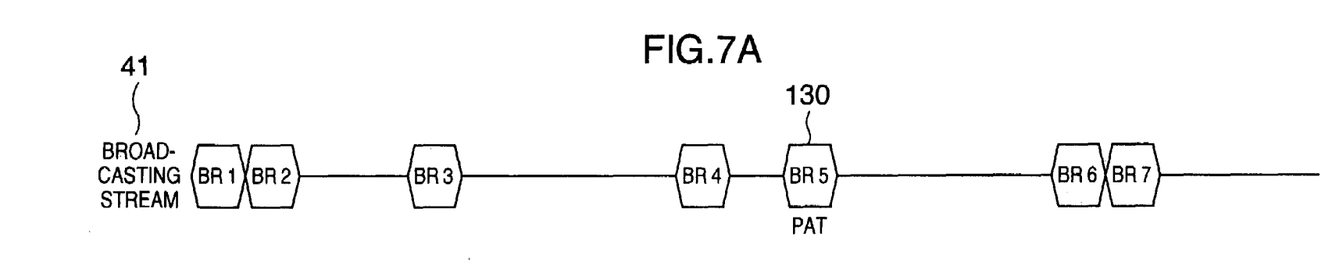
FIGS. 7A–7D each are a timing chart indicative of a packet multiplexed output in a multiplexer of the second embodiment.
Figure 7B:
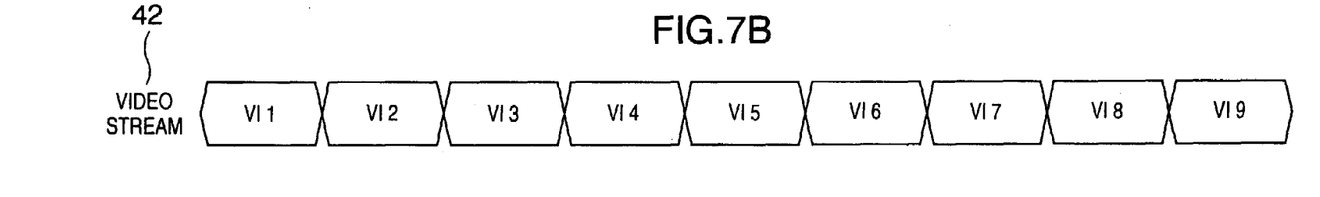
Figure 7C:
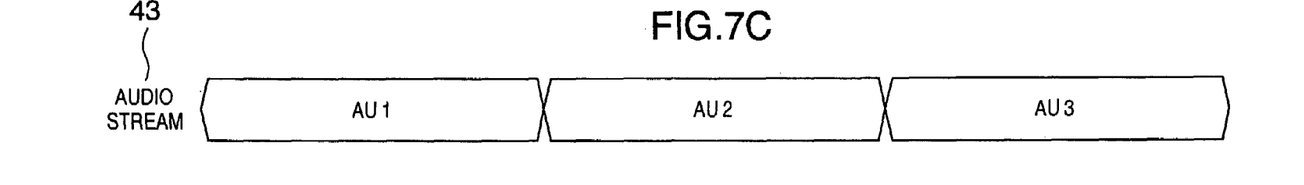
Figure 7D:
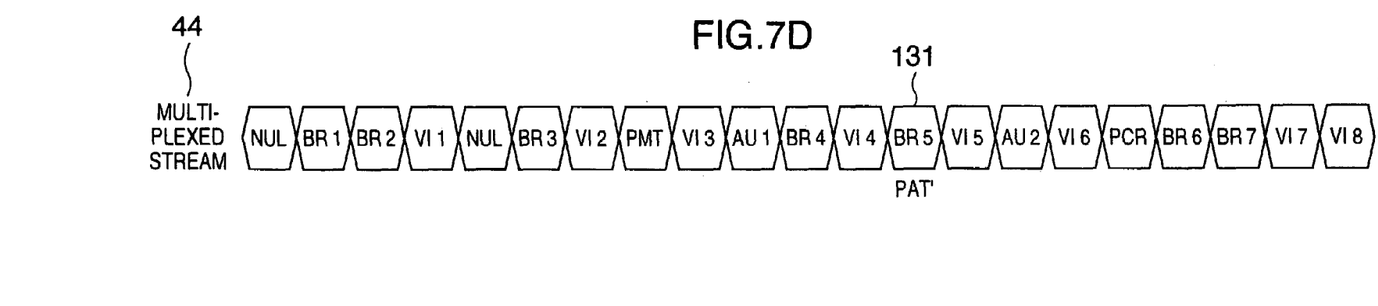

In recording, as shown in FIGS. 7A–7D, the respective broadcasting (BR), video (VI), and audio (AU) packets of the broadcasting stream 41, video stream 42, and audio stream 43 are multiplexed on a time divisional basis and PMT and PCR are added to the multiplexed packets to constitute a multiplexed stream. In this case, the PAT is already contained in the broadcasting stream 41 (shown by a packet 130 of FIG. 7A), but only contains information on a program contained in the broadcasting stream. Thus, the information should be converted so as to include information on the analog broadcasting. In FIG. 7D, reference numeral 131 denotes a PAT converted by the multiplexer 32.

In this case, the packet control circuit 18 uses the data clock 45 produced by the clock recovery unit 13. Thus, the clock changeover switch is set at a contact e, and the video and audio encoders 30 and 31 also use the decoder clock 45. In playback, the clock changeover switch 25 is set at a contact f to use the fixed clock 46.

In playback, the user selects one of the digital and analog broadcasts, the demultiplexer 9 selects only one of the digital and analog broadcasts on the basis of the PAT converted in the recording, and inputs the selected program packet to the MPEG decoder 10 to obtain the video and audio of the desired program.

Thus, the digital broadcasting signal and the digital signal to which the analog broadcasting signal is converted are easily recorded simultaneously in a multichannel. If the video and audio streams 42 and 43 alone are multiplexed in a mode in which no broadcasting stream 41 is outputted in the multiplexer 32 of the FIG. 6 device, an operational mode similar to that described in FIG. 1 is obtained. In this case, the clock changeover switch 25 is required to be set at the contact f in the recording operation. Alternatively, the video and audio signals may be selected from separate sources. For example, only the video signal may be selected from the broadcasting stream 41 and the audio signal may be selected from the audio stream 43. Conversely, only the audio signal may be selected from the broadcasting stream 41 and only the video signal may be selected from the audio stream 43.

Figure 8:
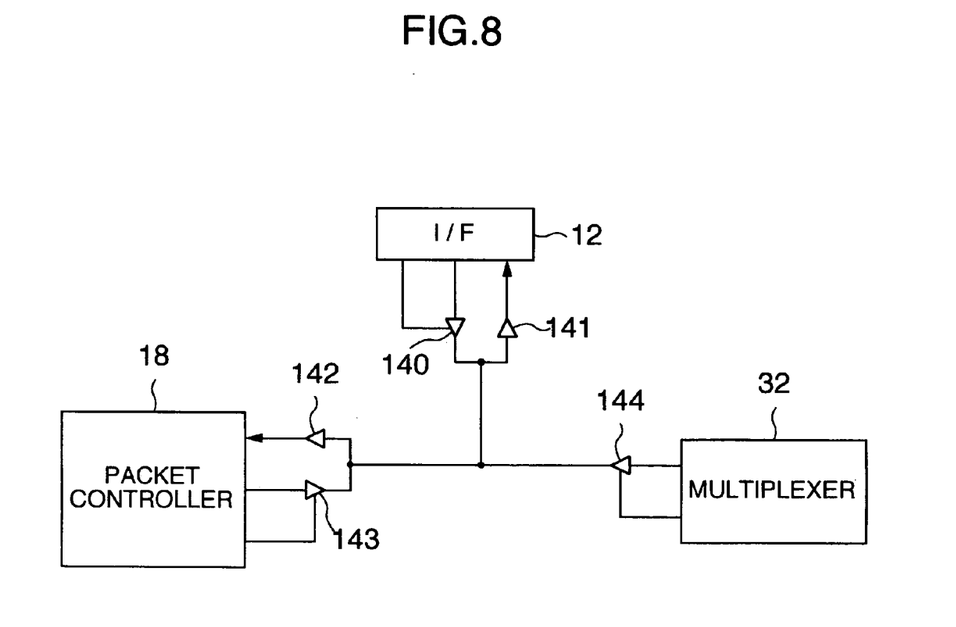
FIG. 8 is a block diagram of an arrangement which uses a bus for transmission of signals.

While in the above the interface 12, multiplexer 32 and packet control circuit 18 are described as handling a one-way signal, these elements may be replaced with an input/output bus. FIG. 8 shows a signal line composition used in this case. Reference numerals 140, 143 and 144 each denote a tri(3)-state buffer whose output can have a high impedance and reference numerals 141 and 142 each denote an input buffer.

In the arrangement of FIG. 8, when the digital broadcasting signal is recorded, the buffers 143 and 144 are each set at high impedance such that the digital broadcasting signal is inputted from the buffer 140 via the input buffer 142 to the packet control circuit 18. When the analog broadcasting signal is recorded, the buffers 140 and 143 are set at high impedance so that the analog broadcasting signal is inputted from the buffer 144 via the input buffer 142 to the packet control circuit 18. In playback, the buffers 140 and 144 are set at high impedance so that the signal of interest is inputted from the buffer 143 via the input buffer 141 to the interface 12. This serves to reduce the number of signal lines between the interface 12 and the packet control circuit 18.

The video A/D converter 28, audio A/D converter 29, video encoder 30, audio encoder 31 and multiplexer 32 may be built either in the recording/playback device 2 or in the digital broadcasting receiver 1. Although not shown, the demultiplexer 9, MPEG decoder 10, NTSC encoder 11, and D/A converter 14 may also be provided in the recording/playback device 2 as well. Thus, even the recording/playback device is capable of providing a reproduced video signal by itself. Of course, the digital broadcasting receiver 1, recording/playback device 2 and encoder 3 may be all integrated in one unit.

While in the above description the recording/playback of a digital signal alone has been described, the present device may have the function of recording/reproducing an analog signal as in a VHS and a VTR available at present.

Figure 9:
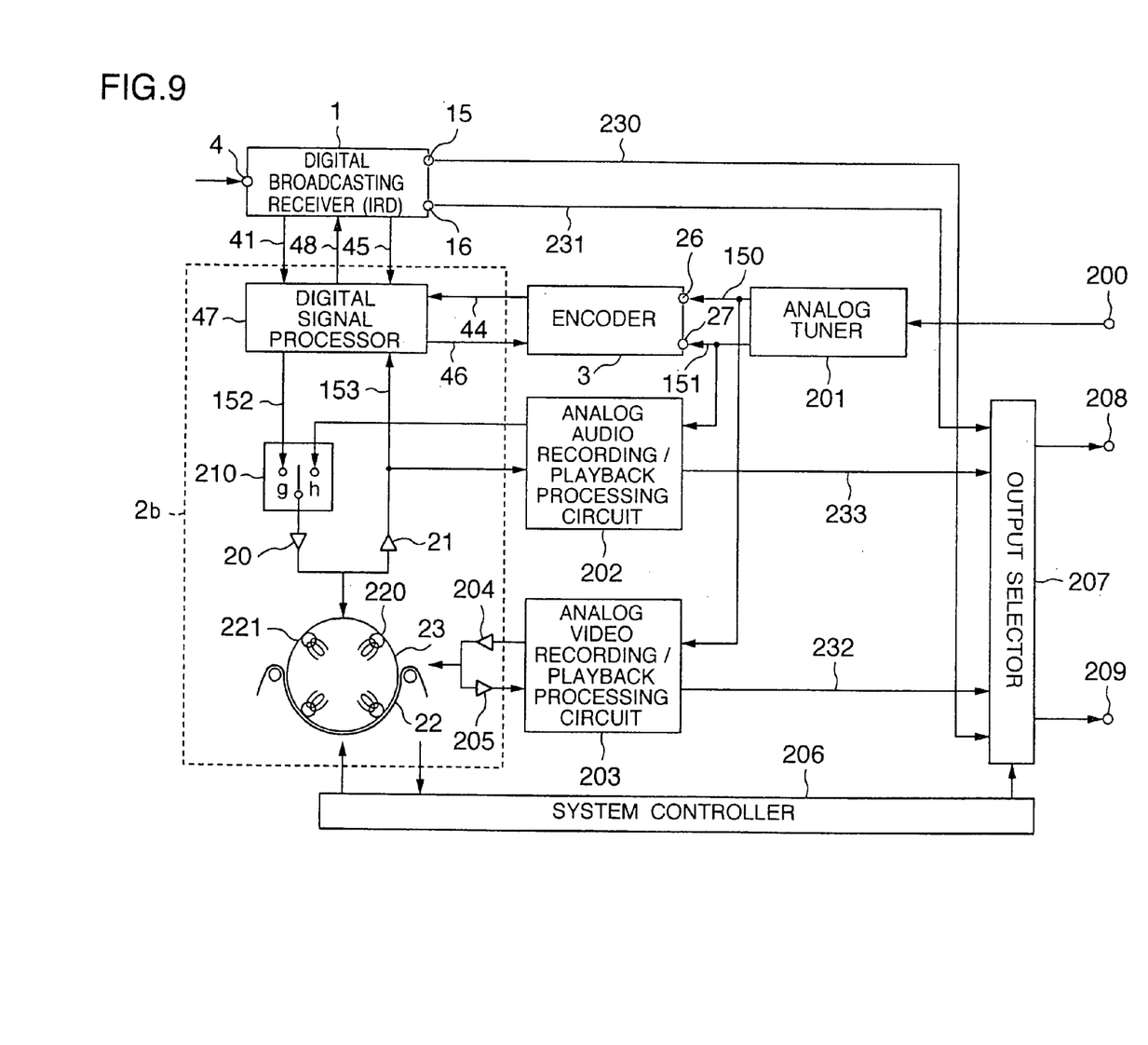
FIG. 9 is a block diagram of a third embodiment of the present invention.

FIG. 9 is a block diagram of a receiving/recording/playback device which is capable of selecting, recording and reproducing one of the digital and analog signals. Like elements in FIGS. 1, 6 and 9 are identified by like reference numerals.

In FIG. 9, reference numeral 200 denotes an analog broadcasting signal input terminal, 201 an analog tuner, 202 an analog audio recording/playback circuit, 203 an analog video recording/playback circuit, 204 an analog video record amplifier, 205 an analog video playback amplifier, 206 a system controller, 207 an output selector, 208 an external audio output terminal, 209 an external video input terminal, 210 a digital recording changeover switch, 220 a video head, and 221 an audio head.

When a digital signal is recorded in the device of FIG. 9, the digital recording changeover switch 210 is set at a contact g, so that the output from the digital signal processor 47 is recorded via the playback amplifier 20 onto the magnetic tape 22 by the audio head 221 of the rotary head 23. Simultaneously, a servo tracking signal is recorded by the system controller 206 in synchronism with the rotation of the rotary head 22. In this case, the output from the analog video record amplifier 204 is stopped by the system controller 206. In playback, a video signal 230 and an audio signal 231 are reproduced by the digital broadcasting receiver 1, and selected by the output selector 270 under the control of the system controller 206, and outputted from the external video and audio output terminals 209 and 208.

When the analog broadcasting signal is digitally recorded, this signal is received at the analog broadcasting signal input terminal 200, and inputted to the analog tuner 201 to produce analog video and audio signals 150 and 151 of a desired program, which are then inputted to the encoder 3.

When the analog broadcasting signal is analog-recorded using a VHS system available at present, the analog broadcasting signal is similarly received at the analog broadcasting signal input terminal 200, and then inputted to the analog tuner 201 to produce analog video and audio signals 150 and 151 of the desired program. The analog video signal 150 is processed by the analog video recording/playback circuit 203 so as to be a signal, for example, conforming to VHS standards, which signal is then recorded via the analog video record amplifier 204 by the video head 220 of the rotary head 23. Simultaneously, the analog signal 151 is produced by the analog audio recording/playback circuit 202 so as to be a signal, for example, conforming to the VHS standards, and then recorded via the digital recording changeover switch 210 set at a contact h and the record amplifier 20 by the audio head 221 of the rotary head 23. A servo tracking signal is recorded as in the digital recording. The video and audio heads 220 and 221 are different in azimuth angle and azimuth-record the video and audio signals.

Because of an azimuth loss in reproduction, the signal recorded by the video head 220 is reproduced by the video head 220 alone while the signal recorded by the audio head 221 is reproduced by the audio head 221 alone. The video signal reproduced by the video head 220 is reproduced via the analog video playback amplifier 205 by the analog video recording/playback processing circuit 203 to produce a reproduced video signal 232, which is then outputted via the output selector 207 from the external video terminal 209. The audio signal reproduced by the audio head 221 is processed by the analog audio recording/playback processing circuit 202 via the reproduction amplifier 21 to produce a reproduced audio signal 233, which is then outputted via the output selector 207 from the external audio terminal 208.

In this case, generally, the digital recording is different in the feeding speed of the magnetic tape 22 from the analog recording. The system controller 206 controls the mode so that for example, a standard mode (SP mode) or a triple mode (EP mode) in the VHS standards is used in the analog recording while a double mode (LP mode) (½ of the tape feeding speed in the standard mode, i.e., the recording time is doubled) is used in the digital recording. In viem of the possibility that digital recording is performed only on a specified tape (for example, an S-VHS tape conforming to the VHS standards), so that the system controller 206 detects the type of a tape (generally, depending on the presence of holes in a cassette) and if the tape is different from the S-VHS tape, the system controller 206 always performs an analog recording operation.

Figure 10:
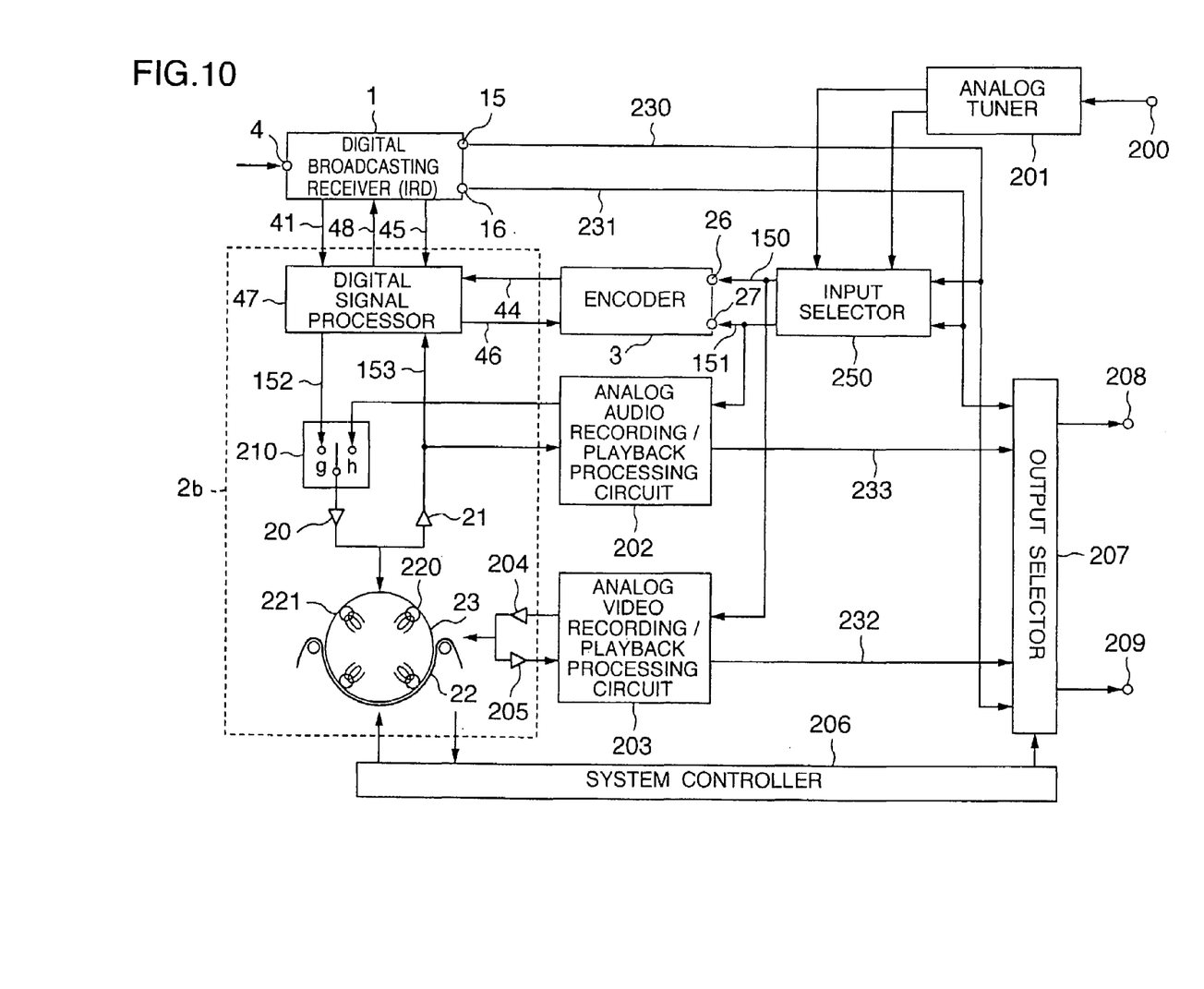
FIG. 10 is a block diagram of a fourth embodiment of the present invention.

In this case, the digital broadcasting signal cannot be digitally recorded as it is so that as shown in FIG. 10, the video and audio signals 230 and 231 produced by the broadcasting signal receiver 1 are inputted via the input selector 250 to the analog video and audio recording/playback processing circuits 203 and 202 to perform analog recording operation.

In playing back, the system controller 206 detects a servo tracking signal to determine the tape speed in the recording operation and automatically selects analog playback in the standard and triple modes and digital playback in the double mode. Thus, the user is not required to pay attention to whether the broadcasting signal is digital-recorded or analog-recorded. The mode is automatically changed to a predetermined mode to thereby provide desired signals from the external video and audio output terminals 209 and 208.

The digital broadcasting receiver 1 may be another device without the output selector 207 so that the output from the digital broadcasting signal receiver 1 may be independent of the outputs from the analog video and audio playback processing circuits 203 and 202.

While in the above the magnetic tape is used as a recording medium, a magnetic disk, optical disk, semiconductor memory or other recording medium may be used. Although not shown in FIGS. 1 and 6, a deciphering circuit which deciphers a cipher signal may be provided between the QPSK demodulator 6 and the FEC 7. Selection of a packet and conversion of a packet on the program information by the interface 12 may be performed by the demultiplexer 9 or packet control circuit 18.

In the recording device, recording/playback device, and receiving/recording/playback device, for a digital broadcasting signal, according to the present invention, the analog television signal is converted to a digital signal, which is then recorded and reproduced. The digital broadcasting signal and the digital signal to which the analog television signal is converted are recorded simultaneously in a multi-channel.

The invention claimed is:

1. A digital signal recording device comprising:
   a digital signal receiver which receives a digital signal in which a compressed video signal and a compressed audio signal are multiplexed in a packet form of a predetermined fixed length;
   a first clock generator which generates a clock which is in synchronism with the digital signal received by the digital signal receiver;
   an analog video signal input unit which inputs an analog video signal;
   an analog audio signal input unit which inputs an analog audio signal;
   a video A/D converter which converts the analog video signal inputted by the analog video signal input unit to a digital video signal;
   a video encoder which information-compresses the digital video signal converted by the video A/D converter;
   an audio A/D converter which converts the analog audio signal inputted from the analog audio signal input unit to a digital audio signal;
   an audio encoder which information-compresses the digital audio signal converted by the audio A/D converter;
   a second clock generator which generates an internal clock used by the video encoder and audio encoder;
   a multiplexer which multiplexes at least a compressed video signal compressed by the video encoder and a compressed audio signal compressed by the audio encoder, to produce a signal having the packet form;
   a recording selection unit which selects the digital signal received by the digital signal receiver or the signal multiplexed by the multiplexer;
   a clock selecting unit which outputs a selected one of the clock generated by the first clock generator or the internal clock generated by the second clock generator;
   a recording unit which adds, to each of signal packets of the selected digital signal selected by the recording selection unit, time information using the clock selected by the clock selecting unit so that, when playing back, time intervals for outputting reproduced signal packets are controlled; and
   wherein the digital signal recording device is operable in a first mode in which the received digital signal is recorded and in a second mode in which the multiplexed digital signal is recorded, and the clock selecting unit selects the clock inputted from the first clock generator in the first mode and selects the internal clock in the second mode.

2. The digital recording device according to claim 1, wherein the compressed video signal and compressed audio signal are signals of packet form having a predetermined byte number specified by a MPEG standard, and the multiplexer is configured to multiplex at least PAT packets and PMT packets.

3. The digital recording device according to claim 2, wherein the multiplexer multiplexes SI table information.

4. A digital signal recording and playback device comprising:
   a digital signal receiver which receives a digital signal in which a compressed video signal and a compressed audio signal are multiplexed in a packet form of a predetermined fixed length;
   a first clock generator which generates a clock which is in synchronism with the digital signal received by the digital signal receiver;
   an analog video signal input unit which inputs an analog video signal;
   an analog audio signal input unit which inputs an analog audio signal;
   a video A/D converter which converts the analog video signal inputted by the analog video signal input unit to a digital video signal;
   a video encoder which information-compresses the digital video signal converted by the video A/D converter;
   an audio A/D converter which converts the analog audio signal inputted by the analog audio signal input unit to a digital audio signal;
   an audio encoder which information-compresses the digital audio signal converted by the audio A/D converter;
   a second clock generator which generates an internal clock used by the video encoder and audio encoder;
   a multiplexer which multiplexes at least a compressed video signal compressed by the video encoder and a compressed audio signal compressed by the audio encoder, to produce a signal having the packet form;
   a recording selection unit which selects the digital signal received by the digital signal receiver or the digital signal multiplexed by the multiplexer;
   a clock selecting unit which outputs a selected one of the clock generated by the first clock generator or the internal clock generated by the second clock generator;
   a recording and playback unit which adds, to each of signal packets of the selected digital signal selected by the recording selection unit, time information using the clock selected by the clock selecting unit and records each signal packet with the time information added so that, when playing back, time intervals for outputting reproduced signal packets are controlled; and
   wherein, when recording, the digital signal recording and playback device is operable in a first recording mode in which the received digital signal is recorded and in a second recording mode in which the multiplexed digital signal is recorded, and the clock selecting unit selects the clock generated by the first clock generator unit in the first recording mode and selects the internal clock in the second recording mode.

5. The digital recording and playback device according to claim 4, wherein the compressed video signal and compressed audio signal are signals in packet form having a predetermined byte number specified by a MPEG standard, and the multiplexer is operable to multiplex at least PAT packets and PMT packets.

6. The digital recording and playback device according to claim 5, wherein the multiplexer multiplexes SI table information.

* * * * *